UNITED STATES PATENT OFFICE.

ROBERT D. POWERS, OF NEW YORK, N. Y., ASSIGNOR TO UNION CLAY PRODUCTS COMPANY, A CORPORATION OF NEW JERSEY.

COMPOSITION OF MATTER.

945,800.  Specification of Letters Patent.  Patented Jan. 11, 1910.

No Drawing. Application filed January 3, 1908, Serial No. 409,233. Renewed September 27, 1909. Serial No. 519,873.

*To all whom it may concern:*

Be it known that I, ROBERT D. POWERS, a citizen of the United States, residing at New York city, in the county of New York and State of New York, have invented certain new and useful Improvements in Composition of Matter, of which the following is a specification.

The object of my invention is a composition which is adapted for use as a waterproof coating or layer, is further capable of being molded to different forms to produce vessels and articles of a character to hold or resist the action of liquids, and which is a non-conductor of electricity and therefore available for insulating, all as fully set forth hereinafter.

The basis of my composition is clay combined with sulfur and found in nature in what is known as "Long Island blue clay" which, as described in the *Technology Quarterly*, published by the Massachusetts Institute of Technology, volume 18 of 1900, is a blue clay, distinctly carbonaceous and characterized by carbonized wood or lignite and both disseminated and nodular sulfid of iron.

I have found that a mixture of clay and sulfur when combined with a small percentage of oxidizable oil will, when heated, result in vulcanizing the oil and the composition as a whole will, at ordinary temperatures, be a permanent, solid, coherent and water-repellent mass, which by heat may be softened or liquefied, so as to be applied as a coating, or rolled, pressed or molded into different forms.

In the manufacture of the material, I take a certain proportion of the blue clay, or clay and sulfur, dry and pulverize the same, so as to run through an 80-mesh sieve, heat the same to a temperature that will cause the sulfur to begin to volatilize (say from 400° to 450° Fahrenheit), and then while stirring the mass add gradually thereto the oil, as linseed oil, rosin oil, cottonseed oil, etc.,—say, in the proportion of from three to twenty per cent. by weight, of the weight of clay,—the proportion of oil depending partly on the amount of sulfid in the mixture, and partly upon the desired hardness of the material to be produced, the hardness increasing as the amount of oil is reduced, and the increase of temperature at which the composition is made. When the oil is thus added at the temperature at which the sulfur is disassociated from the iron, the sulfur is found to act on the oil with a vulcanizing effect, and as the sulfid of iron is most intimately distributed throughout the mass, the vulcanizing of the oil acts to bind together all the particles of the mass and produce a composition of matter which at ordinary temperatures is hard, coherent, solid, and which is water-repellent and water and acid resistant in a high degree; in fact will absorb less water than celluloid and hard vulcanized rubber, and which is also in a high degree a non-conductor of electricity.

This composition may be softened by heat to such an extent that it may be applied by a brush or trowel as a wall coating to protect concrete structures, or to coat walls to prevent the passage or absorption of moisture, or the material may be rolled into sheets of any desired thickness while soft, then tacked to the wall or other surface, and then softened by rolling with a hot roller, or passing a hot iron over the same. In either case the material has the capacity of adhering firmly to masonry even if the latter is damp, and when applied is practically indestructible by the weather. The material while soft may be poured or pressed into molds and thus formed into vessels adapted to receive liquids, and such vessels are of an extremely durable character and while strong are also tough and elastic. The material is an excellent non-conductor of electricity and may be effectively used for insulating purposes.

Made as above described the material is black in color owing to the presence of the iron in the blue clay. By a preliminary treatment of the clay with a suitable acid, as nitric acid, the iron forms with the acid a solution which may be washed away, but the sulfur will remain and the composition may be then produced as before but will be of a light gray color. If desired other colors may then be imparted by the addition of suitable mineral oxids.

By adding a metallic sulfid or sulfur to ordinary clay and treating the mixture as aforesaid a composition is produced having the characteristics specified.

Without limiting myself to the proportions and treatment set forth, I claim:

1. The within described new composition of matter capable of being rendered fluid by heat, consisting of clay, sulfur and oil, the latter being vulcanized by the sulfur and the clay being in a proportion in excess of that of the other material.

2. The within described new composition, consisting of clay containing sulfur combined with oil, the latter being vulcanized by the sulfur and the clay being in a proportion in excess of the other ingredient.

In testimony whereof I affix my signature in presence of two witnesses.

ROBERT D. POWERS.

Witnesses:
  JOHN C. GRAY,
  EDWIN TAYLOR.